United States Patent [19]
Back

[11] 3,889,052
[45] June 10, 1975

[54] NAVIGATION AND SURVEILLANCE SYSTEM

[76] Inventor: Frank G. Back, 53 Sea Cliff Ave., Glen Cove, N.Y. 11542

[22] Filed: Oct. 19, 1973

[21] Appl. No.: 408,110

[52] U.S. Cl. .................................... 178/6; 178/6.5; 178/DIG. 1; 178/DIG. 29; 178/DIG. 38
[51] Int. Cl. ............................................. H04n 7/18
[58] Field of Search. 178/DIG. 38, DIG. 1, DIG. 29, 178/DIG. 20, DIG. 33, 6.5; 15/250.01, 250.05, 313

[56] References Cited
UNITED STATES PATENTS

| | | | |
|---|---|---|---|
| 3,377,427 | 4/1968 | Fischer | 178/7.92 |
| 3,453,049 | 7/1969 | Wagner | 356/73 |
| 3,541,941 | 11/1970 | Barr | 95/45 |
| 3,780,224 | 12/1973 | Levine | 178/7.2 |

Primary Examiner—Robert L. Griffin
Assistant Examiner—Edward L. Coles
Attorney, Agent, or Firm—Albert F. Kronman

[57] ABSTRACT

Spaced viewing stations which include a rockable prism, a zoom lens and a television camera are rotatably mounted at an elevated position upon a vessel. The television camera is adapted to operate at low light levels and means are provided to extend its range for use in bright daylight. The spaced stations can be operated together, individually or to produce stereo pairs on viewing screens. A window for each viewing station is kept clear of foreign material by jets of fresh water and air.

5 Claims, 7 Drawing Figures

PATENTED JUN 10 1975

3,889,052

SHEET 1

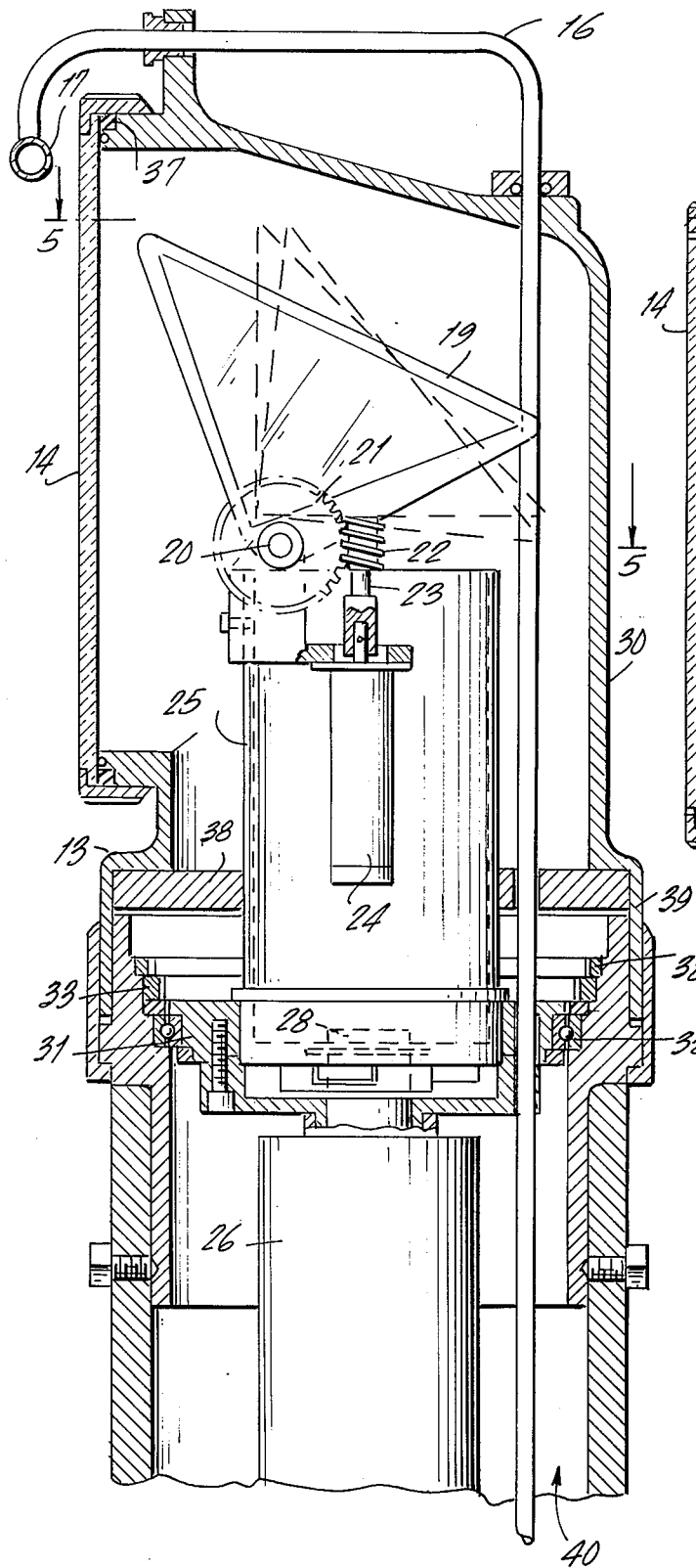
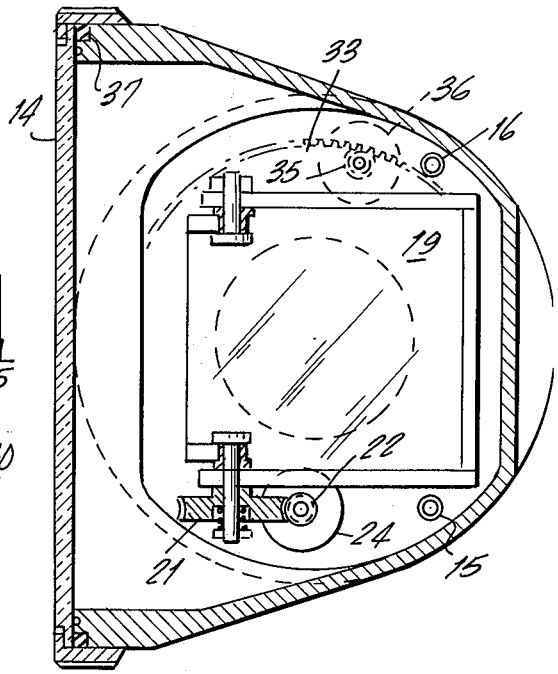
FIG. 4
FIG. 5

FIG. 6
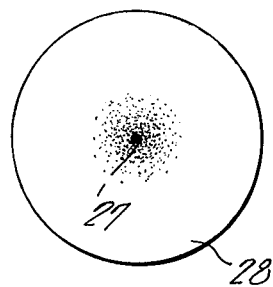
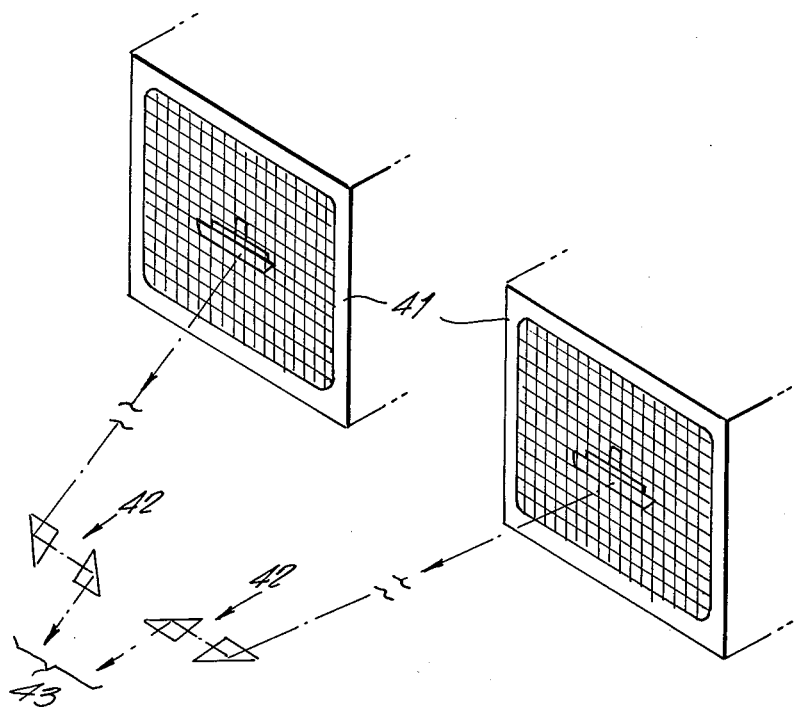
FIG. 7

3,889,052

NAVIGATION AND SURVEILLANCE SYSTEM

BACKGROUND OF THE INVENTION

As ships are built in increasing sizes, navigation and surveillance problems become more acute. At low light levels, the human eye is not a satisfactory means of look-out nor is it possible to quickly scan all quarters of a vessel. Where weather conditions are extreme such as during a storm or at very high or low temperatures, human surveillance is also restricted.

While closed circuit television has been used for monitoring purposes, such systems are not suited for navigation or surveillance, particularly under conditions such as are encountered in marine use. Prior art closed circuit television can not perform over the wide range of illumination required. A single camera such as is used in prior art devices often produces a picture which is confusing. Dirt, water or other foreign material will greatly reduce the effectiveness of prior art closed television systems.

Accordingly, it is an object of the present invention to provide a navigation and surveillance system free of the limitations of prior art devices.

Another object of the present invention is to provide a system highly suited to marine use.

A further object of the present invention is to provide a navigation and surveillance system which will operate under all types of ambient weather conditions without danger to personnel.

Still another object of the present invention is to provide a navigation and surveillance system which will permit scanning of all quarters of a vessel from one or two vantagepoints.

A feature of the present invention is its novel viewing station construction whereby the camera can view a wide area including an arc above and below the horizon.

Another feature of the present invention is its means for clearing the housing window, through which the screne is viewed by the camera, of foreign material.

Still another feature of the present invention is its spaced viewing assembly construction which adds reliability and flexibility to the system.

Other features and objects of the present invention will become apparent from the following description.

SUMMARY OF THE DISCLOSURE

In one preferred embodiment of the present invention, two spaced viewing stations are mounted above the wheel house of a vessel. Each of the viewing stations comprises a housing having a window at the top thereof through which light can pass. The light coming through the window is received upon a prism which directs it downwardly into a varifocal or zoom lens. The zoom lens is attached to a television camera adapted to operate at low light levels. The television camera is connected to a receiver within the wheel house of the vessel. The receiver has a television display screen upon which the scene being viewed by the television camera may be observed. The prism may be swung through an arc so that light coming from above the horizon and also scenes alongside the vessel may be observed. The entire housing may be rotated about its longitudinal axis by means of a motor for scanning purposes and the zoom lens may be operated to shift from telephoto to wide angle operation. If desired, one or both of the viewing stations may be operated and the operation may be in various modes depending upon the nature of the information desired. In order to keep the housing window clean during all conditions, a jet of air and a second jet of fresh water are provided whereby the window can be cleaned of foreign material when necessary.

An attenuator or obscuration spot is used to extend the range of the low light level television camera so that it can be used in bright daylight.

DESCRIPTION OF THE DRAWINGS

In the accompanying drawings forming part hereof, identical elements have been given the same reference numerals, in which drawings;

FIG. 4 is a view in vertical section, somewhat enlarged, of the viewing station shown in FIGS. 1 through 3.

FIG. 5 is a cross sectional view taken on line 5—5 in FIG. 4. FIG. 6 is a top plan view of an obscuration spot used in the present invention.

FIG. 7 is a somewhat diagrammatic view showing how the present invention may be employed to produce stereoscopic display.

GENERAL DESCRIPTION

Figure 1:
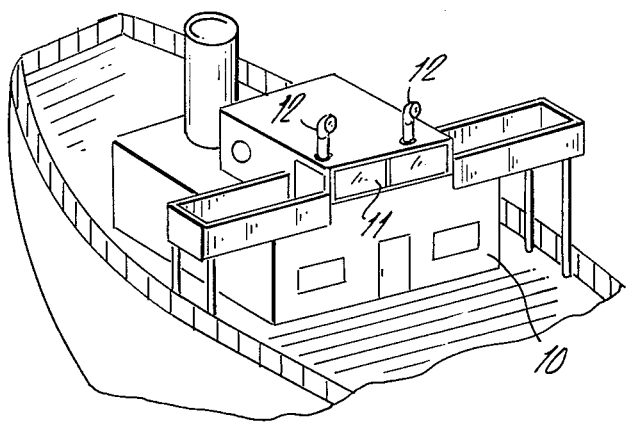
FIG. 1 is a fragmentary, somewhat isometric view of a vessel, showing the manner in which the viewing stations are positioned.
Figure 2:
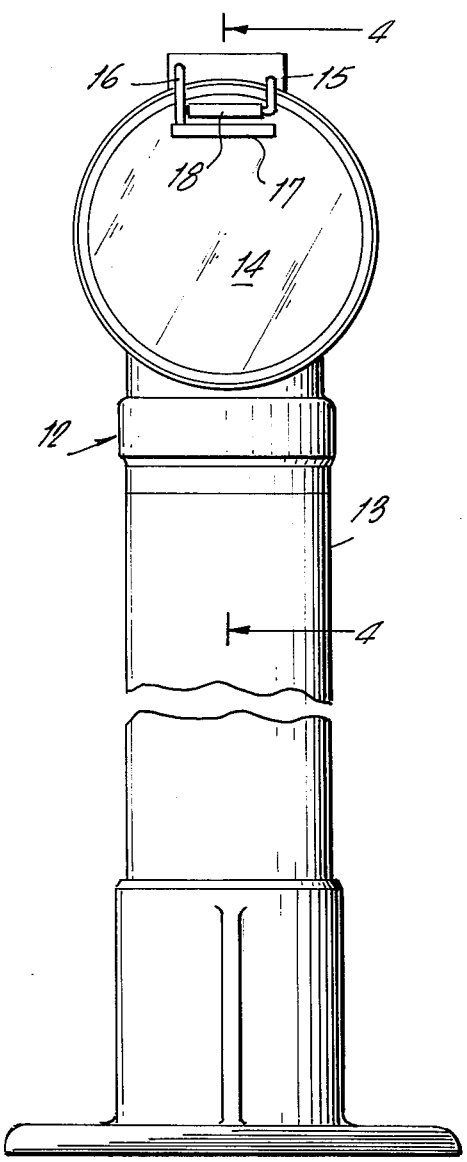
FIG. 2 is a view in front elevation of a viewing station made in accordance with the present invention.
Figure 3:
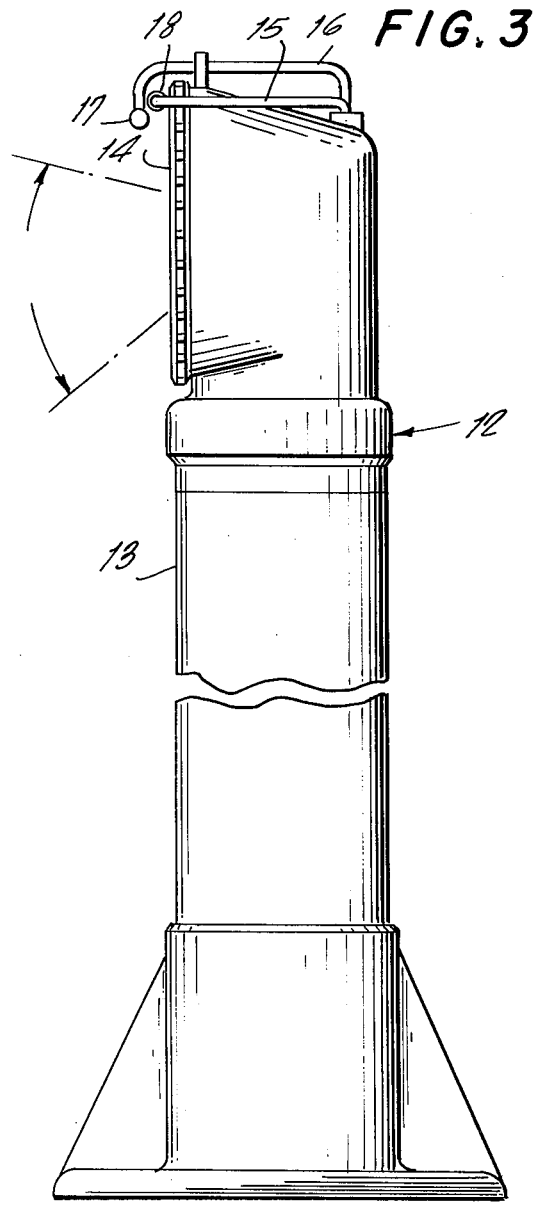
FIG. 3 is a view in side elevation of the viewing station shown in FIG. 1.

Referring to the drawings and particularly to FIGS. 1, 2 and 3; 10 indicates a vessel having a wheel house 11 thereon from which the general navigation and surveillance of the ship is conducted. An upstanding viewing station 12 is secured atop the wheel house at each side thereof. The viewing station, best shown in FIGS. 2 and 3, is enclosed within a rigid, two part, hollow housing 13 having a vertically disposed window 14 in the form of a circular glass plate at the top thereof.

A conduit 15 such as metal tubing is led out of the housing and over the top of said housing as shown in FIG. 3. A second conduit 16 is also led out of the housing and across the top thereof. The first conduit 15 is connected to a source of fresh water (not shown). The second conduit 16 is connected to a source of dry air under pressure (not shown). The outer ends of the conduits 15, 16 are each connected to elongated nozzels 17, 18 from which water and air can be directed across the face of the window 14. It will be apparent that by alternately applying water and then air under pressure across the window, foreign material can be removed. The controlls for the application of water and air are valves well-known in the art which need not be further described.

It will be understood that the housing 13 is formed of suitably rigid material such as steel, aluminum, or the like and the glass plate window is of a thickness which will withstand the ambient conditions to which a vessel is subjected. Moreover, the window 14 is suitably sealed to prevent moisture or other matter from entering the housing 13.

Light from the area being viewed by the viewing station passes through the window 14 and enters a prism 19 within the housing 13, as best shown in FIG. 4. The prism 19 is mounted upon a shaft 20 to the end of which there is secured a spur gear 21.

A worm gear 22, secured to the output shaft 23 of an electric motor 24, is in mesh with the spur gear 21. The motor 24 is reversible and the prism 19 may thus be rocked upon the shaft 20 by a remote switch (not shown) to change the vertical viewing angle of the system.

Light entering the prism 19 is directed downwardly into a varifocal or zoom lens 25. The zoom lens 25 is coupled to a television camera 26 so that light passing through the zoom lens is directed into the camera.

The camera 26 is of the low light intensity type such as an image intensified Videcon camera. Cameras of this type are capable of operating at very low light levels such as star light and producing television images of scenes which the unaided human eye has difficulty in seeing. On the other hand, such television cameras are not adapted for high levels of illumination and would become damaged even though conventional iris protection is provided. In the present invention, the range of the image intensified Videcon camera is greatly extended so that the same camera can be used both for low level as well as high level illuminated scenes. This wide range is made possible by the use of an obscuration spot best shown in FIG. 6. The obscuration spot may be deposited, for example, upon a glass disc 28 in front of or behind the camera iris 29.

The obscuration spot may be formed by the deposition of metal upon the disc 28 in such manner that the outer portion of the spot has a relatively high transmission as compared with the central portion of the spot. This graduated transmission will cause the amount of light entering the camera to be drastically reduced as the iris closes when the navigation and surveillance system is directed toward a scene having high levels of illumination. It is to be understood that in the preferred embodiment, the iris employed is of the automatic type which will open and close in response to the light levels encountered. Such automatic irises are well-known in the photographic art and need not further described here.

As an example of the range possible with the present structure, given a maximum iris opening of $f2.8$ (T-transmission equal to 4.5) and an iris which may be closed down to $f40$ at 1.3 mm, the transmission (T) equals 400 times 1000X2 or approximately T=800,000.

The upper portion 30 of the housing 13 which carries the window 14 also serves to support the zoom lens 25 and the camera 26. A mounting plate 31 freely carried upon ball bearing 32 is employed to receive the end of the zoom lens 25 and the camera 26. A ring gear 33 is secured to the inner wall of the lower portion 34 of the housing 13. The mounting plate 31 has secured thereto a small reversible electric motor 35 which is in mesh with the ring gear 33 as indicated in FIG. 5. In this manner, the upper portion of the housing 30 may be rotated about the vertical axis of the viewing station 12 to scan a wide area. It is possible to swing the upper portion of the housing through an angle of 350° with the present invention. A method of operating the motor 35 consists of well-known switch means which need not be further described. In order to assure trouble free operations over a prolonged period of time, it is essential that the interior of the housing 13 be sealed from ambient conditions of moisture, dirt, etc. For this purpose, seals indicated at 37, 38 have been provided, as well as the male and female coupling 39 between the upper and lower portions of the housing 13. In addition, a source of air under pressure indicated by the arrow 40 in FIG. 4 is directed into the viewing station 12 at all times. Since the air is at a pressure higher than atmospheric pressure, it effectively prevents foreign material from entering the housing 13. In order to insure proper operation of the viewing station during all ranges of temperature, the air 40 is taken from the wheel house which is normally air conditioned in summer and heated in winter.

The above described apparatus lends itself to many modes of operation. In ship navigation, the spaced viewing stations 12 may be employed for the purposes of scanning the horizon and the immediate path of the ship. A watch may be maintained in all kinds of weather and objects sighted which could not be discerned by the human eye. Both sides of the ship may be viewed at the same time and displayed on separate screens within the wheel house. In addition, a second set of monitors may be installed in the Captain's cabin so that he can view the same scene being observed in the wheel house from below decks. By reason of the 350° rotation of the viewing stations, it is possible to observe all parts of the ship without leaving the wheel house. The tilting feature of the prism 19 enables the navigator to observe portions of the sky and also to watch objects along side the ship such as small craft or even obstructions. By reason of the zoom lens, which may be remotely controlled in a manner well known in the zoom lens art, the navigator can shift from the telephoto to the wide angle position as desired.

Both of the spaced viewing stations may be directed at the same scene for comparison purposes. Having two points of view will often clarify the image being received. When the ship is tied up, the viewing stations can be used to observe dock side activity. Here again, particularly under conditions of low light levels, the two viewing stations can be directed at the same area of interest.

Since the viewing stations are spaced from each other, it is possible to produce stereo pairs on the receiving screens 41 in the manner shown in FIG. 7. By use of prisms 42 placed in front of the viewer's eyes 43, it is possible to observe the screens simultaneously and receive a three dimensional or stereoscopic view. Such views are desirable where critical judgements as to the proper course to take are essential.

Having thus fully described the invention, what is claimed as new and desired to be secured by Letters Patent is:

1. A surveillance system comprising, in combination, two horizontally spaced viewing stations, each having a rotatable hollow housing, a window in the housing to admit light from an area to be viewed into the housing, a rockable prism to receive the light passing through the window and redirect it, a zoom lens to receive the light coming from the prism, a television camera to receive the light transmitted by the zoom lens, a television receiver connected to each of the television cameras to display the scene viewed by each of the viewing stations and cleaning means carried by the housings and directed at the outer surface of the windows to remove foreign matter therefrom.

2. Apparatus according to claim 1 in which the housings are formed with an upper rotatable portion, a lower fixed portion and means including a motor to drive the rotatable portion.

3. Apparatus according to claim 1 in which the prism is mounted upon a shaft coupled to a remotely controlled source of rotary power to rock the prism into a desired position for viewing.

4. Apparatus according to claim 1 in which the television camera is of the low light intensity type, an iris is incorporated into the camera optical system and an obscuration spot of graduated transmission is disposed in front of the iris.

5. Apparatus according to claim 4 in which an obscuration spot is disposed adjacent the iris and is graduated so as to be less transmittant at its center.

* * * * *